UNITED STATES PATENT OFFICE.

SCHUYLER W. MAHAN, OF MIDDLEBURY, VERMONT, ASSIGNOR TO HIMSELF AND CHARLES E. CARDELL, OF SAME PLACE.

IMPROVEMENT IN ARTICLES OF FOOD FROM CIDER.

Specification forming part of Letters Patent No. 143,918, dated October 21, 1873; application filed September 22, 1873.

*To all whom it may concern:*

Be it known that I, SCHUYLER W. MAHAN, of Middlebury, in the county of Addison and State of Vermont, have invented a new and useful Manufacture or Edible Composition and Mode or Process of Producing Such; and do hereby declare the same to be fully described as follows:

In making the said composition I take five gallons, for instance, of cider, as it comes from the press, and put the same into a suitable boiler, after which I mix with it two tablespoonfuls of flour and the whites and yelks of two to four eggs, first thoroughly compounding the flour and the yelks and whites of the eggs. Next, the temperature of the mixture of cider, flour, and the fluid matters of the eggs should be raised to a boiling heat, or about such, after which ten to twenty-five pounds of sugar are to be added, and the whole agitated or stirred until thorough dissolution of the sugar may have taken place. Next, the solution is to be raised to a boiling temperature and skimmed, the boiling and skimming being continued until a sufficient evaporation may have taken place to reduce the liquid to the requisite density. After this the liquid should be strained and put into bottles or suitable vessels for preservation, use, or sale.

If desirable, the product thus obtained may be flavored with any proper essence, essential oil, or matter, the whole, when completed, answering for various purposes in cookery, as well as for being eaten on bread, or of being used as a sauce for puddings.

I make no claim to cider simply boiled and clarified by means of albumen; but

What I do claim is—

A composition of cider, flour, and sugar, subjected to evaporation and clarification by means substantially as set forth.

SCHUYLER W. MAHAN.

Witnesses:
E. EDWARDS SMITH,
ROLLIN BIRCHARD.